(12) United States Patent
Harris

(10) Patent No.: US 7,606,805 B2
(45) Date of Patent: Oct. 20, 2009

(54) DISTRIBUTED SEARCH SYSTEM AND METHOD

(75) Inventor: Larry R. Harris, Concord, MA (US)

(73) Assignee: EasyAsk Acquisition, LLC, Bedford, MA (US)

( * ) Notice: Subject to any disclaimer, the term of this patent is extended or adjusted under 35 U.S.C. 154(b) by 133 days.

(21) Appl. No.: 11/304,017

(22) Filed: Dec. 14, 2005

(65) Prior Publication Data

US 2006/0149719 A1 Jul. 6, 2006

(51) Int. Cl.
*G06F 17/30* (2006.01)
(52) U.S. Cl. ............... 707/10; 707/2; 707/3; 707/4; 707/5; 707/6; 704/1; 704/2; 704/8; 704/9
(58) Field of Classification Search ............ 707/2–7, 707/10; 704/1–2, 8–9
See application file for complete search history.

(56) References Cited

U.S. PATENT DOCUMENTS

| | | | | |
|---|---|---|---|---|
| 5,197,005 A | * | 3/1993 | Shwartz et al. ............ | 707/2 |
| 5,404,295 A | * | 4/1995 | Katz et al. ............... | 707/2 |
| 5,584,024 A | * | 12/1996 | Shwartz .................. | 707/4 |
| 5,640,553 A | * | 6/1997 | Schultz .................. | 707/5 |
| 5,659,742 A | * | 8/1997 | Beattie et al. ........... | 707/104.1 |
| 5,664,126 A | * | 9/1997 | Hirakawa et al. ......... | 715/751 |
| 5,694,559 A | * | 12/1997 | Hobson et al. ............ | 707/3 |
| 5,748,974 A | * | 5/1998 | Johnson ................. | 704/9 |
| 5,787,418 A | * | 7/1998 | Hibbetts et al. .......... | 707/4 |
| 5,812,840 A | * | 9/1998 | Shwartz ................. | 707/4 |
| 5,924,089 A | * | 7/1999 | Mocek et al. ............ | 707/4 |
| 5,950,190 A | * | 9/1999 | Yeager et al. ............ | 707/3 |
| 5,963,940 A | * | 10/1999 | Liddy et al. ............. | 707/5 |
| 6,018,735 A | * | 1/2000 | Hunter .................. | 707/5 |
| 6,026,388 A | * | 2/2000 | Liddy et al. ............. | 707/1 |
| 6,041,323 A | * | 3/2000 | Kubota .................. | 707/5 |
| 6,173,279 B1 | * | 1/2001 | Levin et al. ............. | 707/5 |
| 6,256,623 B1 | * | 7/2001 | Jones ................... | 707/3 |

(Continued)

OTHER PUBLICATIONS

"Simplifying data access: The Enery data collection (EDC) project"—Ambite et al.—proceedings of the 2000 annual national conference on Digital government research—pp. 1-11—ACM 2000 (dg.o; vol. 128).*

(Continued)

*Primary Examiner*—Jean B. Fleurantin
*Assistant Examiner*—Anh Ly
(74) *Attorney, Agent, or Firm*—Greenberg Traurig, LLP

(57) ABSTRACT

A method and system for providing distributing a query to devices on a communications network, such as servers on the internet, using an application that can survey a subscriber's server that can include text documents and databases, and use the formatting information and data from the survey to create at least one dictionary customized to the subscriber's data sources. A user seeking information can initiate a search or query from an initiating device using keywords, natural language terms, connectors, expressions, etc., and the query can be transmitted to various subscriber customized dictionaries. The customized dictionaries can customize the query based on respective subscriber databases and text documents, text search engines, etc., to produce an customized query result. The query results can be filtered and integrated for presentation to the initiating device. Search results can be customized using user preference or profile information.

15 Claims, 6 Drawing Sheets

U.S. PATENT DOCUMENTS

| | | | |
|---|---|---|---|
| 6,304,864 B1* | 10/2001 | Liddy et al. | 706/15 |
| 6,341,340 B1* | 1/2002 | Tsukerman et al. | 711/150 |
| 6,446,064 B1* | 9/2002 | Livowsky | 707/5 |
| 6,453,312 B1* | 9/2002 | Goiffon et al. | 707/3 |
| 6,460,029 B1* | 10/2002 | Fries et al. | 707/3 |
| 6,539,374 B2* | 3/2003 | Jung | 707/4 |
| 6,571,241 B1* | 5/2003 | Nosohara | 707/6 |
| 6,598,039 B1* | 7/2003 | Livowsky | 707/3 |
| 6,601,059 B1* | 7/2003 | Fries | 707/3 |
| 6,606,613 B1* | 8/2003 | Altschuler et al. | 706/21 |
| 6,633,846 B1* | 10/2003 | Bennett et al. | 704/257 |
| 6,636,853 B1* | 10/2003 | Stephens, Jr. | 707/10 |
| 6,658,404 B1* | 12/2003 | Cecchini | 707/3 |
| 6,741,791 B1* | 5/2004 | Wymore et al. | 386/46 |
| 6,751,606 B1* | 6/2004 | Fries et al. | 707/3 |
| 6,778,971 B1* | 8/2004 | Altschuler et al. | 706/55 |
| 6,910,003 B1* | 6/2005 | Arnold et al. | 704/4 |
| 6,999,963 B1* | 2/2006 | McConnell | 707/100 |
| 7,050,977 B1* | 5/2006 | Bennett | 704/270.1 |
| 7,069,560 B1* | 6/2006 | Cheyer et al. | 719/317 |
| 7,177,798 B2* | 2/2007 | Hsu et al. | 704/9 |
| 7,286,990 B1* | 10/2007 | Edmonds et al. | 704/275 |
| 2002/0059069 A1* | 5/2002 | Hsu et al. | 704/257 |
| 2002/0147578 A1* | 10/2002 | O'Neil et al. | 704/9 |
| 2003/0014421 A1* | 1/2003 | Jung | 707/102 |
| 2003/0018632 A1* | 1/2003 | Bays et al. | 707/3 |
| 2003/0078766 A1* | 4/2003 | Appelt et al. | 704/9 |
| 2003/0130976 A1* | 7/2003 | Au | 706/55 |
| 2005/0036593 A1* | 2/2005 | Zirngibl et al. | 379/88.17 |
| 2005/0060325 A1* | 3/2005 | Bakalash et al. | 707/100 |
| 2005/0144004 A1* | 6/2005 | Bennett et al. | 704/270.1 |
| 2005/0165766 A1* | 7/2005 | Szabo | 707/3 |
| 2006/0200353 A1* | 9/2006 | Bennett | 704/270.1 |

OTHER PUBLICATIONS

"Advanced conceptual network usage in Library database queries"—Jeroen Hoppenbrouwers—Sep. 1998—pp. 1-17.*

* cited by examiner

DISTRIBUTED SEARCH SYSTEM AND METHOD

CLAIM OF PRIORITY

This application claims priority to U.S. Ser. No. 60/221,546 entitled "Distributed Natural Language Search Method", naming Larry R. Harris as inventor, and filed on 28 Jul. 2000, the contents of which are herein incorporated by reference in their entirety.

BACKGROUND (1) Field

The systems and methods relate generally to search systems and methods, and more particularly to efficiently locating and accessing information across a communications network such as the internet.

(2) Description of Related Art

The internet provides a single conduit to reach a supplier of a product or information that can be located, in some cases, throughout the world. One challenge for internet customers or consumers, and hence internet businesses, is knowing the suppliers to contact, and how to gain proper access to the suppliers. The success of commerce on the internet therefore depends on customers' ability to locate products and/or information easily and quickly; however, industry statistics indicate that over seventy percent of potential customers to internet websites leave the websites without finding their desired product(s)/information. This result is not desirable for the website in generating profits directly through internet sales, or indirectly through advertising revenue.

First generation techniques for finding products and/or information on the internet were advertiser-based and listed websites, rather than individual products. Second generation techniques involved aggregating product and other information from multiple supplier sites (product catalogs) at online shopping malls or business-to-business "vortals" to allow consumers to access consolidated listings across multiple suppliers. It is anticipated that the next generation supplier networks may dynamically access information from relevant suppliers in response to a buyer's requirements and present only the suppliers and products that precisely meet the consumers' needs.

SUMMARY

The present disclosure provides a system and method for performing a search of data sources that can reside on a network such as the internet. The search can be specific to the content and organization of the data sources. The search can also be a distributed search to multiple data sources. Data sources can include textual documents such as web pages that can include program instructions, and other types of text documents, text files, and databases, although other data sources can be included. The data sources can reside on one or more servers or other devices on a network. Searches or queries can be initiated using natural language expressions, sentences, keywords, or combinations thereof, from which data source content-specific queries can be generated and executed. In some embodiments, a dynamically generated customized query can be formed and issued for each data source to be searched or queried.

In one embodiment, the methods and systems can provide an application that can be installed on a subscriber's server to allow a website and/or other data sources accessible to the server, to be searched without requiring pre-integration, reformatting, etc. of the server or the data on the server. In another embodiment, the application can reside on another device or server that can be in communication with the subscriber's website server. For the purposes of the methods and systems described herein, a "website" can be understood to include a document on a network such as the internet or an intranet, that can include a home page and other documents and files that can be accessed through the webpage either directly or indirectly, and the website can also include databases that can be accessed directly or indirectly. The application can develop a customized query for the website and/or other data sources accessible to the server, using wired or wireless communications systems and protocols.

When a subscriber maintains a product catalog database, for example, the installed application can access the database and build a customized dictionary that can convert a natural language or keyword search query to a precise SQL query for the subscriber's product catalog database. Additionally and optionally, if the target of the search is text, the installed application can build a custom dictionary can generate an advanced text search of the website using one or more standard text search engines that may be otherwise installed at or available to the website.

In some embodiments, the methods and systems can allow an internet user or other internet accessible entity, including non-human entities, to initiate a search from, for example, a website. Such a website can hereinafter be referred to as an initiating website, and can be the network location from which the search can be broadcast or distributed to subscriber websites and hence, customized dictionaries. In one embodiment, the customized dictionaries can receive a HTTP command and thereafter reach behind security measures such as firewalls to access otherwise protected or secure data. The systems and methods can also allow subscribers to receive a search command or query information from the initiating website, utilize the subscriber's local customized dictionary to translate the search for the respective website, data source, etc., initiate a customized search of the subscriber's website, data source, etc., and extract the relevant information for submission as search results to the initiating website. In one embodiment, the search can be an SQL search or a text search.

In one embodiment, the application at a particular subscriber's server can immediately determine from the received search command and the customized dictionary, that a search may not be necessary because the website and/or data source may not include relevant information, products, services, etc.

In an embodiment, the search results from subscribers can be formatted in XML, and the initiating website can receive the multiple search results and integrate the XML results for presentation to a user at the initiating site. The results can also be formatted for presentation by email, instant messaging, or for voice. In some embodiments, the query can be submitted by email, instant messaging, or voice.

The methods and systems can produce search results that can include a subscriber (supplier) name, a product name or identifier, a product price, a product description, a product image, etc. In one embodiment, the user's (or querying entity's) selection of a product can provide a transition to an order basket that can be at the initiating website, the subscriber's website, or an alternate website. In one embodiment, search results can be accompanied by a URL of the order processing system that can be used to order the product; and, when the user selects the item, the relevant product information can be submitted to the purchasing system to initiate the purchase process.

The methods and systems can allow a subscriber to access and search a cooperating subscriber's website and products in a peer-to-peer relationship.

The methods and systems can accommodate customized searches. Accordingly, a user can establish an account or profile that can be transmitted or otherwise associated with the search or query request from the initiating device or website. The user's profile can be incorporated into the customized searches at the subscriber websites. In one embodiment, the user can transmit the profile with the query information or search request, while in another embodiment, the user can be identified at the initiating device or website by an account number that can allow access to a locally or centrally stored profile for submission with the inquiry. In yet another embodiment, a user can submit or otherwise be associated with a profile such that subscribers can customize a search or query based on the user profile and/or identity.

The methods and systems can allow a user to customize the presentation of search results. For example, a user can select an option to view search results by price. In an embodiment, a subscriber can customize or otherwise control the search results. For example, a subscriber may not produce a search result for a particular product unless the inventory level for that product exceeds a particular value.

In one embodiment, subscribers can update respective customized dictionaries to produce more accurate searches that can reflect changes in terminology, etc. In an embodiment, a dictionary can be updated locally or remotely via a wired or wireless network.

The methods and systems can allow hierarchical searching of multiple servers and/or data sources using a "broker" dictionary that can receive query information and/or a search request from the initiating website or device, and broadcast the request to several other customized dictionaries, known as broadcast dictionaries, that can be located, for example, on various subscribers, servers. The broker dictionary can receive and compile search results from broadcast dictionaries, and transfer a single, composite search result to the initiating website. The broker dictionary can be utilized as an intelligent filter to intelligently select only specific broadcast dictionaries that may be more likely to produce relevant search results.

In an embodiment, the methods and systems can identify customized dictionaries using a URL that can allow a remote server to access the dictionary, create a local copy, modify the copy, and transmit the modified copy to the original location for re-writing, etc.

Other objects and advantages will become apparent hereinafter in the specification and drawings.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope hereof.

Figure 1:
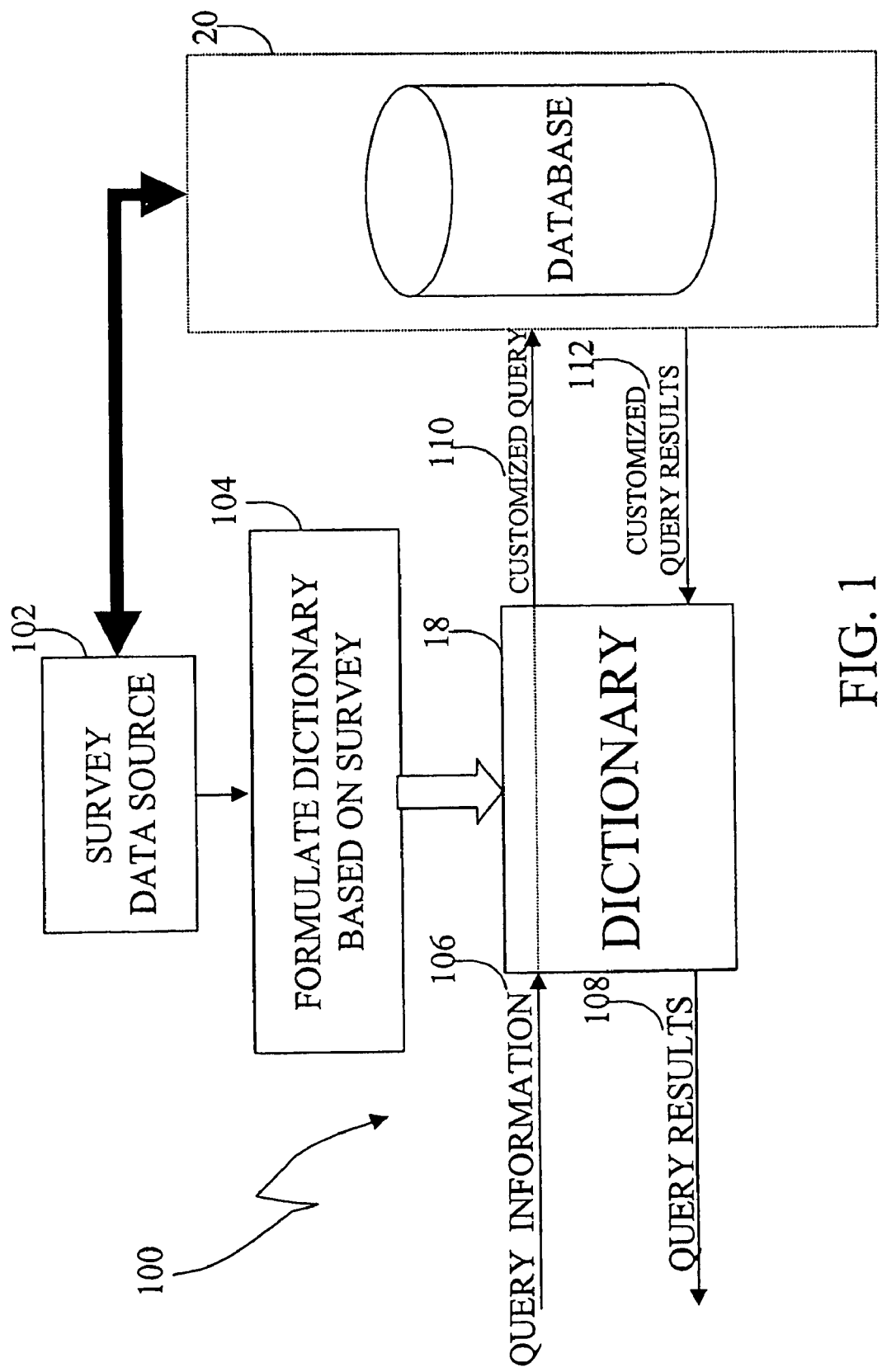
FIG. 1 displays an architectural block diagram of a system that practices the principles of the methods and systems described herein for a single data source.

Referring now to FIG. 1, there is a block diagram of a system 100 that implements the techniques described herein. As will become apparent herein, the techniques as described in relation to FIG. 1 have many applications and embodiments, some of which can be referenced herein with respect to other figures. FIG. 1, and other Figures provided herein, can therefore be understood to represent the techniques, and while pictorial objects can be represented in the Figures, those with ordinary skill in the art will understand that these pictorial objects can be provided for understanding only and are not intended to be a limitation on the methods and systems. Accordingly, pictorial objects and their associated concepts can be combined with other pictorial objects, or additionally and optionally, separated into further pictorial objects, while not departing from the methods and systems.

As FIG. 1 indicates, the techniques herein can be initiated by a survey 102 of a data source 20. The survey can be automated or manually guided to identify data sources 20. As will be understood herein, data sources can include one or more textual documents, databases, etc., where a textual document can be understood to include a text file, web page, etc., that can be formatted text such as HTML, XML, some other SGML format, or another text format. A data source that is a database can use a format compatible with MySQL, SQL, Oracle, Informix, Sybase, the Freedom Engine, Access, ODBC, db2, etc. Those with ordinary skill in the art will recognize that the methods and systems are not limited to the type or format of the data sources. Through the survey 102, the data source(s) can be analyzed with regard to data format, data type, data organization (e.g., categorization, hierarchical structure), relevant terms and phrases, relationships between words, terms, and phrases, identification of abbreviations or word/phrase variations, codes related to data (purchase codes, product codes, price codes, or any other code that can relate to categorizing the product in terms of price, demographic appropriateness or characteristics, etc.) etc. Other information related to the data source can be manually provided. In some embodiments, the survey can be automated, and additional information including the number of data sources, etc., can be determined. For the purposes of illustration with respect to the embodiment of FIG. 1, a database data source 20 is illustrated, although such an example is provided for illustration and not limitation, and multiple and varied format data sources, including textual data sources, can be utilized for the methods and systems.

A dictionary 18 can be formulated 104 based on the survey results 102. The dictionary 18 can be understood to be, for example, a computer program that can be implemented in a higher level language such as C, C++, Java, etc., that can receive query information as input, and can provide as output, a query formatted and otherwise customized for the data source.

Referring again to FIG. 1, query information 106 can be received by the dictionary 18. Although FIG. 1 illustrates only one dictionary 18, it can be understood that there can be multiple dictionaries, and in such embodiments, the query information 106 can be received by the multiple dictionaries. The illustrated dictionary 18 can generate a customized query 110 based on the received query information 106 and the survey results. The customized query 110 can be applied to the data source 20 from which the survey was conducted. The customized query results. 112 can, in some embodiments, be returned to the dictionary 18. In some embodiments, the dictionary 18 can format, arrange, aggregate, etc., the customized query results 112 and transfer or forward the results. For example, the query results 108 can be transferred to the entity that requested that supplied the query information 106, or another entity can be designated or otherwise specified to receive the query results 108. As indicated previously herein, FIG. 1 illustrates the principles of the methods and systems which have wide applicability.

Figure 2:
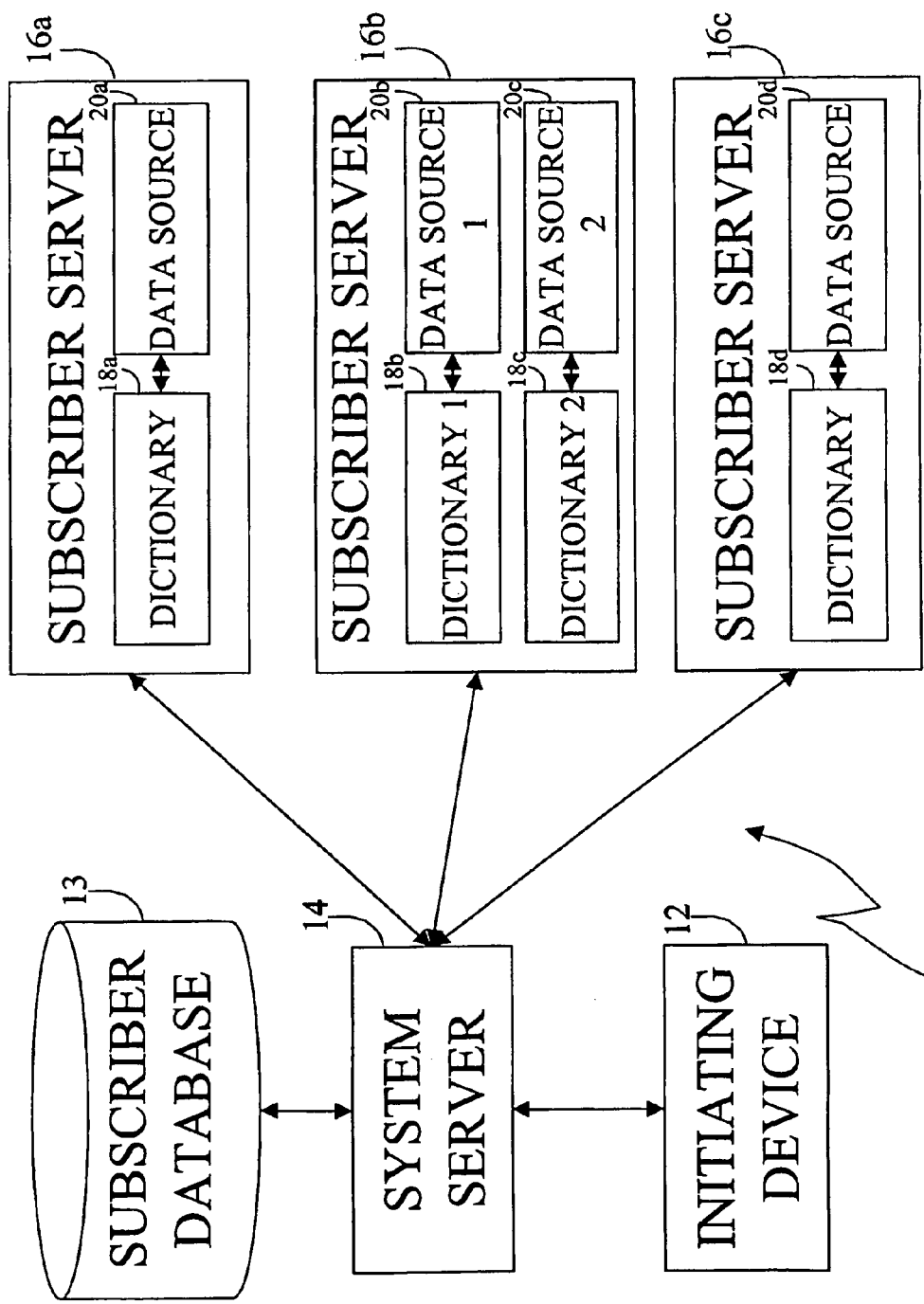
FIG. 2 displays systems and methods according to FIG. 1 for an exemplary internet embodiment.

Referring now to FIG. 2, there is an architectural block diagram 10 of an illustrative system that utilizes the methods and systems for an internet application. The FIG. 1 system indicates an initiating device 12 that can include a digital computer system that can utilize a wired or wireless communications link to connect to a communication network such as the internet. A user of the initiating device 12 can utilize different peripheral devices that can be integrated with or otherwise configured for compatible use with the initiating device 12. For example, the initiating device 12 can include a keyboard, keypad, stylus, digital camera, microphone, etc., that can communicate data to the initiating device using wired or wireless communications systems and/or protocols, etc. The initiating device 12 can be a microprocessor-based system including a computer workstation, such as a PC workstation or a SUN workstation, handheld, palmtop, laptop, personal digital assistant (PDA), cellular phone, etc., that includes a program for organizing and controlling the initiating device 12 to operate as described herein. Additionally and optionally, the initiating device 12 can be equipped with a sound and video card for processing multimedia data. The initiating device 12 can operate as a stand-alone system or as part of a networked computer system. Alternatively, the initiating device 12 can be dedicated devices, such as embedded systems, that can be incorporated into existing hardware devices, such as telephone systems, PBX systems, sound cards, etc. Accordingly, it will be understood by one of ordinary skill in the art that the initiating device 12 described herein has wide applicability and can be incorporated in many systems, and realized in many forms.

For a system according to FIG. 1, the initiating device 12 can be connected to a network such as the internet and can be equipped with what is well-known as an internet "browser" such as the commercially available Netscape Navigator, Internet Explorer, etc., browsers, and those with ordinary skill in the art will recognize that, depending upon the initiating device 12 and its configuration, the browser can differ, and hence references herein to a browser can include references to a user interface to the internet or other network, wherein the methods and systems herein are not limited to the browser or other network interface. Furthermore, the initiating device 12 can access the internet using wired or wireless communications links and/or protocols.

The initiating device 12 can communicate with a server that can be represented in the FIG. 1 system as a System Server 14. The illustrated server 14 can be also be a microprocessor-based system including a computer workstation, such as a PC workstation or a SUN workstation, handheld, palmtop, laptop, personal digital assistant (PDA), cellular phone, etc., that includes a program for organizing and controlling the server 14 to operate as described herein. Additionally and optionally, the server 14 can be equipped with a sound and video card for processing multimedia data. The server 14 can operate as a stand-alone system or as part of a networked computer system. Alternatively, the server 14 can be dedicated devices, such as embedded systems, that can be incorporated into existing hardware devices, such as telephone systems, PBX systems, sound cards, etc. In some embodiments, servers can be clustered together to handle more traffic, and can include separate servers for different purposes such as a database server, an application server, and a Web presentation server. The server 14 can also include one or more mass storage devices such as a disk farm or a redundant array of independent disk ("RAID") system for additional storage and data integrity. Read-only devices, such as compact disk drives and digital versatile disk drives, can also be connected to the server 14. As used herein, the term "server" is intended to refer to any of the above-described servers. In an embodiment, the initiating device 12 and the server 14 can be similar systems.

In an embodiment of the FIG. 1 system, the initiating device 12 can access the server 14 via the internet, and the server 14 can provide a webpage or other interface to the initiating device 12 to allow a user of the initiating device 12 to input data indicative of a query for information. Those with ordinary skill in the art will recognize that this query information can be of varying formats, and can include one or more keywords and/or natural language terms or expressions that can optionally be linked using one or more logical operators, including boolean expressions or notations such as "and", "or", and "not". In some embodiments, additionally and optionally, "+" and "−" can be used to indicate desired and undesired terms, respectively, for example. Those with ordinary skill in the art will recognize that there are many different connectors and methods of relating keywords, sentences, questions, and/or natural language words or expressions that can be used.

For the purposes of the discussion herein, natural language can be understood to be a word, phrase, grouping of words, etc., in a language written or spoken by humans.

Additionally and optionally, the query information can include a full text statement or question or other natural language data. The query information can be entered to the initiating device 12 and thereafter edited using one or more of multiple peripheral devices connected to the initiating device that can include a keyboard, keypad, stylus, mouse, microphone, etc., wherein those of ordinary skill in the art will recognize that the methods and systems herein are not limited to the mechanism of inputting query information to the initiating device 12. Furthermore, the methods and systems are not limited to the format of inputting the query information or a user interface that can be provided to facilitate such entry. For example, in some embodiments, the query information can be input using one or a combination of text input boxes, text documents, menu selections, drop-down boxes, radio buttons, etc. The illustrated initiating device 12 also can provide a user with the ability to initiate the search, and in one embodiment, search initiation can be understood as entering the query information.

Furthermore, the query information can be entered by a variety of formats, including human users that can utilize peripheral devices and/or integrated software to enter and/or retrieve data by, for example, a keyboard, stylus, voice commands, etc. In some embodiments, the query information can additionally and optionally be provided by automated and/or non-human sources using scripts or other programming techniques. Accordingly, references herein to a user of the initiating device 12 can be understood to include any entity, human or non-human, that can cause query information to be provided to the initiating device 12.

Upon initiation of a search or query by a user of the initiating device 12, for the FIG. 1 system, the initiating device 12 can transfer the query information to the server 14 that can include a list of subscribers that can be included, in one embodiment, in a database 13. The subscriber database 13 can be accessed locally or through a network such as the internet using wired or wireless communications devices and protocols. The subscriber database 13 can be understood to include a memory having one or more physical or logical partitions and/or segments, and can optionally and additionally utilize one or more of well-known database packages including MySQL, SQL, Oracle, Informix, Sybase, the Freedom Engine, Access, ODBC, DB2, etc., with such examples provided for illustration and not limitation. In an embodiment, the database 13 can reside in a memory of the server 14.

In an embodiment, the server 14 can access subscriber information from the database 13 to cause the query information to be distributed to one or more subscribers 16a, 16b, 16c. In the illustrated system, the database 13 can include URLs of subscriber servers 16a, 16b, 16c (also referenced herein collectively or individually as 16). The query information can be transferred, distributed, or otherwise communicated to the subscriber servers 16 simultaneously as in a broadcast, or using an ordered scheme that can include network or load balancing schemes. The FIG. 1 system illustrates the communication of query information to three subscribers 16a, 16b, 16c although the methods and systems can be applied to one or more subscribers and the number of subscribers is not a limitation. For an embodiment wherein the system server 14 communicates to the subscriber servers 16 via a network such as the internet, the transfer of the query information can be performed using HTTP or HTTPS, for example, although such an example is provided for illustration and not limitation.

The illustrated subscribers 16a, 16b, 16c can be servers as described previously herein with respect to the System Server 14. The servers 16 can include one or more data sources 20a, 20b, 20c, 20d (also referenced-herein collectively or individually as 20). The subscribers 16 also include a dictionary 18a, 18b, 18c, 18d (also referenced herein collectively or individually as 18) that can be associated with and based on the data sources 20a, 20b, 20c, 20d. In an embodiment such as that of FIG. 1, a data source 20 can be associated with a dictionary 18, although in some embodiments, one dictionary 18 can be associated with more than one data source 20. Alternately, in an embodiment, one data source 20 could be associated with more than one dictionary 18.

For the illustrated systems and methods, as described previously herein, a dictionary 18 can be understood to be a translator between the received query information, received from the System Server 14 as described herein, and a data source 20. For the illustrated systems where one dictionary 18 corresponds to a data source 20, a dictionary 18 can be formed by installing a computer program on the subscriber server 16. In an embodiment, the computer program can be run from a remote location via a network. As indicated previously, in some embodiments, the survey computer program can be understood as a survey engine that examines the data sources, 20 on the server 16. As indicated previously, the dictionary 18 can incorporate the survey engine results to provide a customized interface between received query information, and the data source 20.

For example, if the data source 20 is a database, the survey engine can identify labels of tables, rows, and columns, and abbreviations of labels, when necessary. This survey information can be incorporated into a dictionary 18 to allow received query information to be properly translated for the database. In the case of a database, query information from a user of the initiating device 12 can be an input to a dictionary 18, and the dictionary output can be a customized SQL query that uses terminology, abbreviations, etc., derived from the survey engine. In some embodiments, the dictionary output can be a customized HTTP search string that can utilize a general access method that can be created for the data source (e.g., the HTTP search string can be formatted based on drop-down menus/boxes, radio button selections, and/or other general access provisions). In an example of a database embodiment, a database can be configured with columns or rows that relate to colors that are abbreviated, such as "Rd" for Red, "Bl" for Blue, etc. If query information is submitted with the word "Blue", the customized dictionary can cause a customized query to be formatted using "Bl" according to the survey information. Accordingly, row information and column information can be understood herein to include a characterization of the database information that can include header information, element information, extraneous information that can otherwise provide insight to the database, etc.

Additionally and optionally, when the data source 20 is text, the survey engine can scan the text, identify synonyms, abbreviations, etc., for incorporation into a dictionary 18. A dictionary for a text data source 20 can format received query information into an advanced text query that can utilize a standard text engine. Some examples of standard text engines can include AltaVista, Excite, Google, Infoseek, Inktomi, Microsoft Index Server, etc., although such examples are provided for illustration and not limitation. Optionally and additionally, the dictionary can convert the received query information into a HTTP query that can be formatted according to a web page on the server 16, where the web page can include text input boxes, radio buttons, drop-down boxes, check-boxes, etc.

The illustrated dictionaries 18, can also include a natural language and linguistic processor that is well-known in the art for parsing received information, performing context analysis, generating synonyms, etc. The dictionaries 18 also include a spell corrector that can verify word spellings and generate phonetic equivalents, although such features can reside independent of the spell corrector. The dictionaries 18 can also perform word variations to better interpret and/or distinguish words, for example, between similar words such as "build", "builder", and "building." Furthermore, the dictionaries 18 can perform phrase identification that includes identifying word groups within context. For example, "wrinkle-free" can be interpreted with respect to clothes, or in another manner with respect to plastic surgery. Accordingly, it can be understood that the dictionaries 18 for the illustrated systems and methods can extend the received query information to include terminology that is compatible with, understood by, and/or interpreted by a data source 20 to which the dictionary 18 corresponds.

A dictionary 18 can be equipped with a foreign language translator to convert received query information from one language, to another language that is compatible with the data source 20. In some embodiments, a dictionary 18 can be established for different languages, while in another embodiment, a single dictionary 18 can translate queries for multiple languages.

A dictionary 18 can determine that received query information from the initiating device 12 is not compatible with the data source 20 or otherwise cannot be interpreted. In an embodiment, the dictionary 18 can generate a list of possible interpretations for a user of the initiating device 12 to select.

Additionally and optionally, the dictionary 18 can cause the initiating device 12 to provide a user with a request for additional, alternate, or restated query information.

A dictionary 18 can also identify a Frequently Asked Question (FAQ) and supply either a pre-defined answer to a user at the initiating device 12, or redirect the user to, for example, a web page that includes an answer. A dictionary 18 can also recognize and respond appropriately to query information that seeks a "yes" or "no" answer, time-based queries using date or time terminology including "now", "last month", "before", "between", etc., and arithmetic queries that can include mathematical concepts such as "lowest-priced", "top 5", "less than", etc.

In the illustrated systems and methods, results of a customized data source search can be provided to a dictionary 18, and the dictionary 18 can thereafter organize, format, etc., the search results for return to the initiating device 12. The information can be presented via the subscriber server 16 to the System Server 14 and hence to the initiating device 12, or directly from the subscriber server 16 to the initiating device 12. In one embodiment, the search results can be formatted in XML to allow the server 16 to format the results according to a web application that can be executing on the subscriber server 16. For example, the XML output from the dictionary 18 can be used in Extensible Stylesheet Language (XSL) stylesheets or other web formatting options. Those with ordinary skill in the art will recognize that many formats for the dictionary output can be utilized, and the use of XML herein is provided for illustration and not limitation. For example, in one embodiment, HTML templates can be utilized to present search results directly to an internet browser without requiring additional programming. Other forms of SGML documents or other textual formats can be used without departing from the scope of the techniques provided herein. Alternately, search results can be presented graphically using bar charts, pie charts, histograms, Excel compatible spreadsheets, etc. Search results can also be saved as an Excel compatible file for later analysis. Additionally and optionally, the methods and systems herein can allow the search results to be provided to an application through a variety of Application Programmer Interfaces (APIs).

In some embodiments, the requested query information can provide significant search results. The methods and systems herein can provide the search results using a format that includes categories and sub-categories from which a user at the initiating device 12, for example, can further select. Aggregate data can also be presented with hyperlinks to detailed information to allow users to retrieve further information without providing further details, follow-up questions, etc. Those with ordinary skill in the art will thus recognize that although the methods and systems presented herein are provided with respect to an internet illustration that includes browsers, etc., other interfaces can be utilized to retrieve query information and present query results.

A user or system manager associated with a server 16 can provide or otherwise designate filtering schemes for providing search results. A subscriber, for example, can determine to exclude products from particular users based upon a received profile (i.e., age, etc.). Those with ordinary skill in the art will recognize that there are many parameters by which a subscriber can filter or otherwise customize the search results.

The methods and systems can operate with security measures that can be established by a system manager related to a server 16. For example, query information can be received or otherwise associated with identity information. A dictionary 18 can be configured to prevent the query information from being applied to a data source for which the user is not allowed to otherwise access. In such an embodiment, the methods and systems herein can be incorporated behind a firewall.

Those with ordinary skill in the art will recognize that the methods and systems can also be practiced outside of a firewall. In such an embodiment, a distributed or other search can be performed across a network such as the internet or an intranet, wherein accessibility to the data sources may not be protected by a firewall. As indicated previously, search results can be aggregated at the initiating device 12 or another remote device for presentation to a user.

A dictionary 18 can also generate an output log that can be understood to be a computer file that can be accessed by a system administrator or other authorized individual or entity according to the server 16 configuration or other authorization scheme. The log file can be stored locally on the server 16 or another memory device connected to the server 16 through a wired or wireless network. The log files can be configured to provide data pertaining to received query information, customized search queries, generated search results, query identity, data source identity, time of query, etc., with such examples provided only for illustration. By editing the log file, a system administrator can view the effectiveness of the dictionary with respect to query information, desired results, security, etc. Filters can be applied to the log files to provide log results based on results generated, date, time of day, time period, etc.

In the illustrated embodiments, a system administrator or other authorized user can edit a dictionary 18 to further customize the dictionary 18. Such edits can result from an analysis of the log file, for example. Dictionary edits can also be performed to further enhance business objectives. For example, automated, scheduled searches can be performed to query databases for stock information, etc. In an embodiment, an email can be generated based on a search. For example, in an automated search established by an administrator to verify stock quantity, once a stock quantity reaches a predetermined value, an email can be sent to the administrator and/or another interested party.

A system manager or other authorized user can also customize a dictionary 18 and provide rules against which searches can be performed and search results can be presented. For example, a system manager can edit the dictionary to include a formula or rule for determining a profit margin, and have results presented in order of profit margin. Other rules could present results by vendor, product availability, price, etc., with such examples provided for illustration and not limitation. Such manual customization of a dictionary 18 can be performed and applied according to a particular user, or a group of users. The dictionary editing can be performed locally or via a network.

In some practices of the systems and methods, system requirements can provide for certain query information to be provided. If the query information is not provided by the user at the initiating device 12, the user can be prompted to enter the remaining information.

Accordingly, a dictionary 18 can include one or more of relevant content and/or values from a data source 20, a representation of schemas, relationships, and category hierarchies from the data source 20, configuration settings according to users and/or groups of users, business rules, terminology definitions or specifications, synonyms, a language translator, a natural language processor, an output data formatter, and a log file generator.

The methods and systems herein can also allow for the aggregation of customized query results from multiple data sources and/or dictionaries. For example, as provided herein, query information submitted at an initiating device 12 can be broadcast to one or more dictionaries in broadcast or some other sequenced manner, wherein the search results can be filtered or otherwise aggregated at the System Server 14. The filtering or other presentation of information performed by the System Server 14 can be performed additionally and optionally to filtering and organization that can be performed at individual dictionaries 18 and or servers 20.

Figure 3:
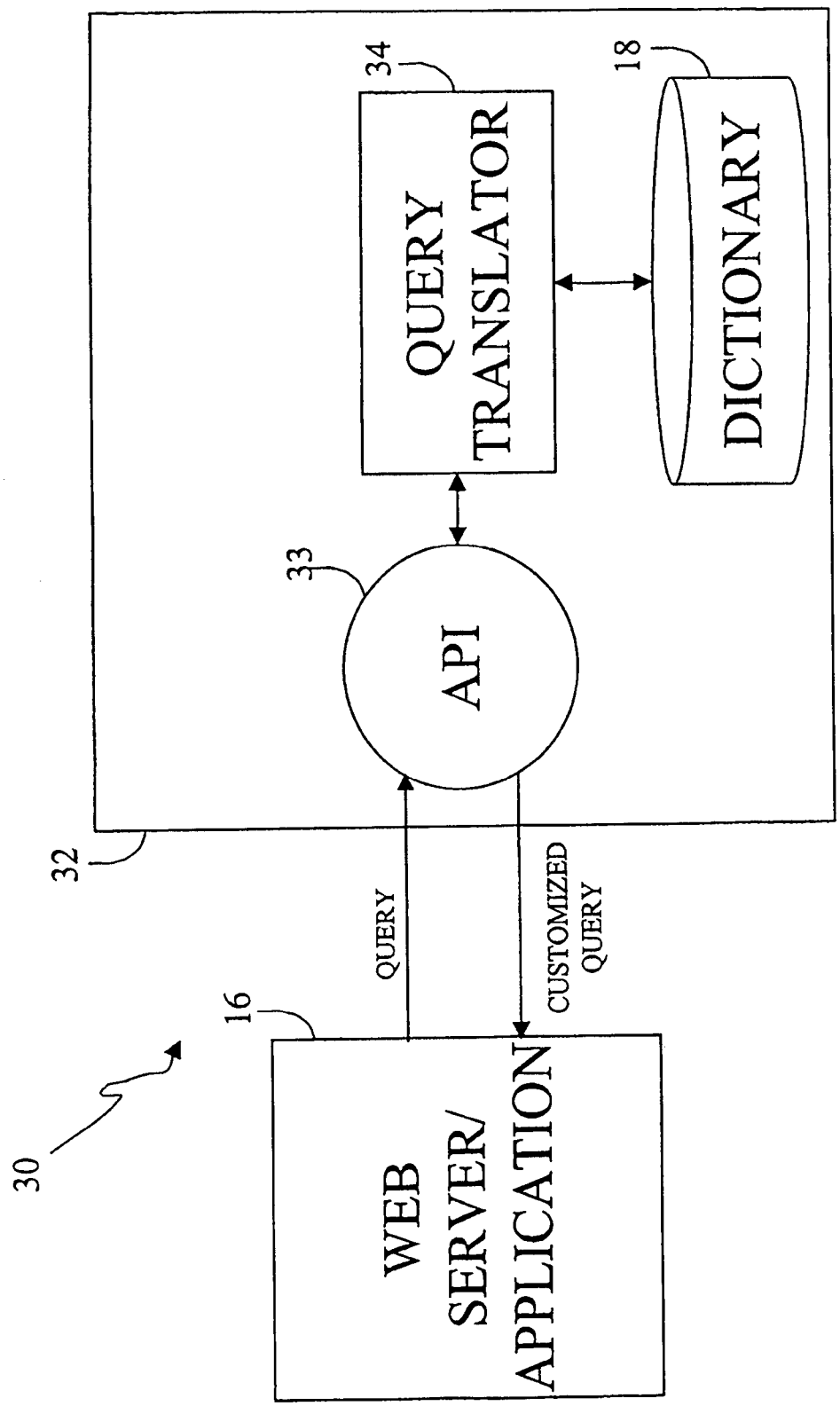
FIG. 3 displays systems and methods according to FIG. 1 for an exemplary query translation architecture.

Referring now to FIG. 3, there is a diagram representing the methods and systems in an embodiment that can be known as a query translation embodiment 30. In the FIG. 3 configuration, query information can be presented to the system 32 through an API 33 and to a query translator 34. The query translator 34 can translate the query information into a SQL statement, advanced text search expression, HTTP call, etc, by accessing a dictionary 18 that corresponds to a data source 20 to be searched. For the FIG. 3 embodiment, a server 16 can provide the received query information to the system 32 to receive from the system 32 via the query translator 34, a SQL statement, advanced text search expression, HTTP call, etc. The server 16 can thereafter submit or apply the returned search to a relational database, text search engine, etc.

Figure 4:
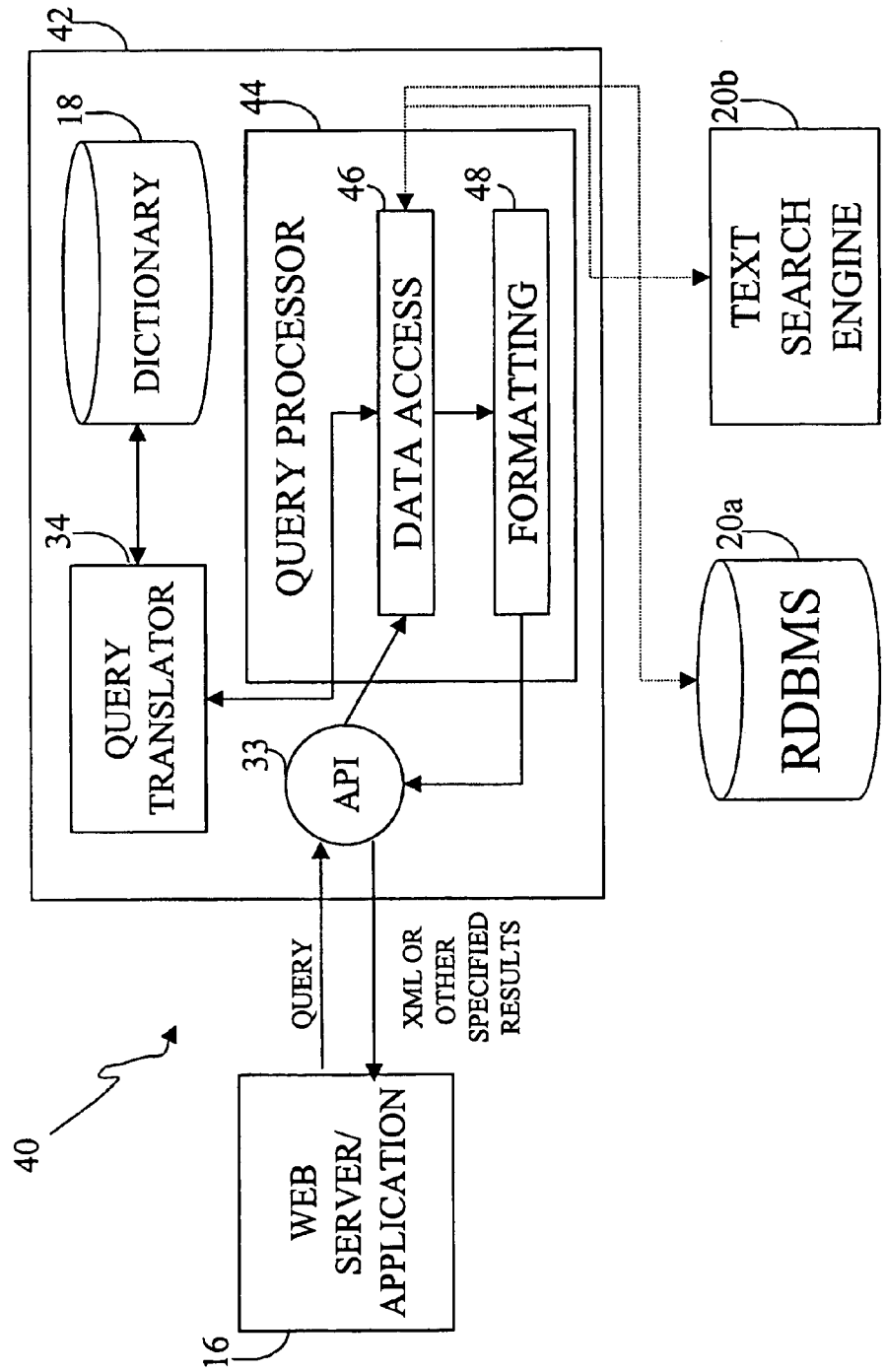
FIG. 4 displays systems and methods according to FIG. 1 for an exemplary architecture providing query translation and retrieval.

Referring to FIG. 4, there is a diagram of a configuration 40 for the methods and systems that can allow the return of a data set for formatting a search request, by an application that can reside on the server 16 or another device. As indicated by FIG. 3, query information can be provided by the server 16. The query information can include or be accompanied by a dictionary selection, a user ID, business rules, etc., and a desired output format to the system 42 through its API 33. This interface can be implemented using HTTP, Component Object Module (COM), Java, Enterprise, Javabean, C, C++, Visual Basic, or another well-known method. The natural language query, dictionary selection, and output format can be input to a query processor 44 that includes a data access module 46 that transfers the query information and dictionary selection to a query translator 34. The query translator 34 can utilize the specified dictionary 18 and query information to generate a customized query as provided herein. Those with ordinary skill in the art will recognize that although FIG. 4 depicts a single dictionary 18 and query translator 34, the embodiment of FIG. 4 can include multiple dictionaries and/or query translators. The customized query can be transferred to the data access module 46 that can issue the customized query to the data source 20 corresponding to the query. FIG. 4 demonstrates two data sources 20 that include a relational database management system 20a and a text search engine 20b, although other data sources can be utilized and specified. The customized query search results can be returned to the data access module 46 and thereafter transferred to the formatting module 48 with the specified output format. The formatting module 48 can format the query results based on the specified format, and transfer the formatted output to the server 16 through the API 33. In an embodiment, the formatted results can be transferred to the server 16 in XML format. A web application on the server 16 or another location can transform the XML search results into a desired presentation style using, for example, the W3C standard extensible stylesheet language transformation (XSLT) and HTML.

Figure 5:
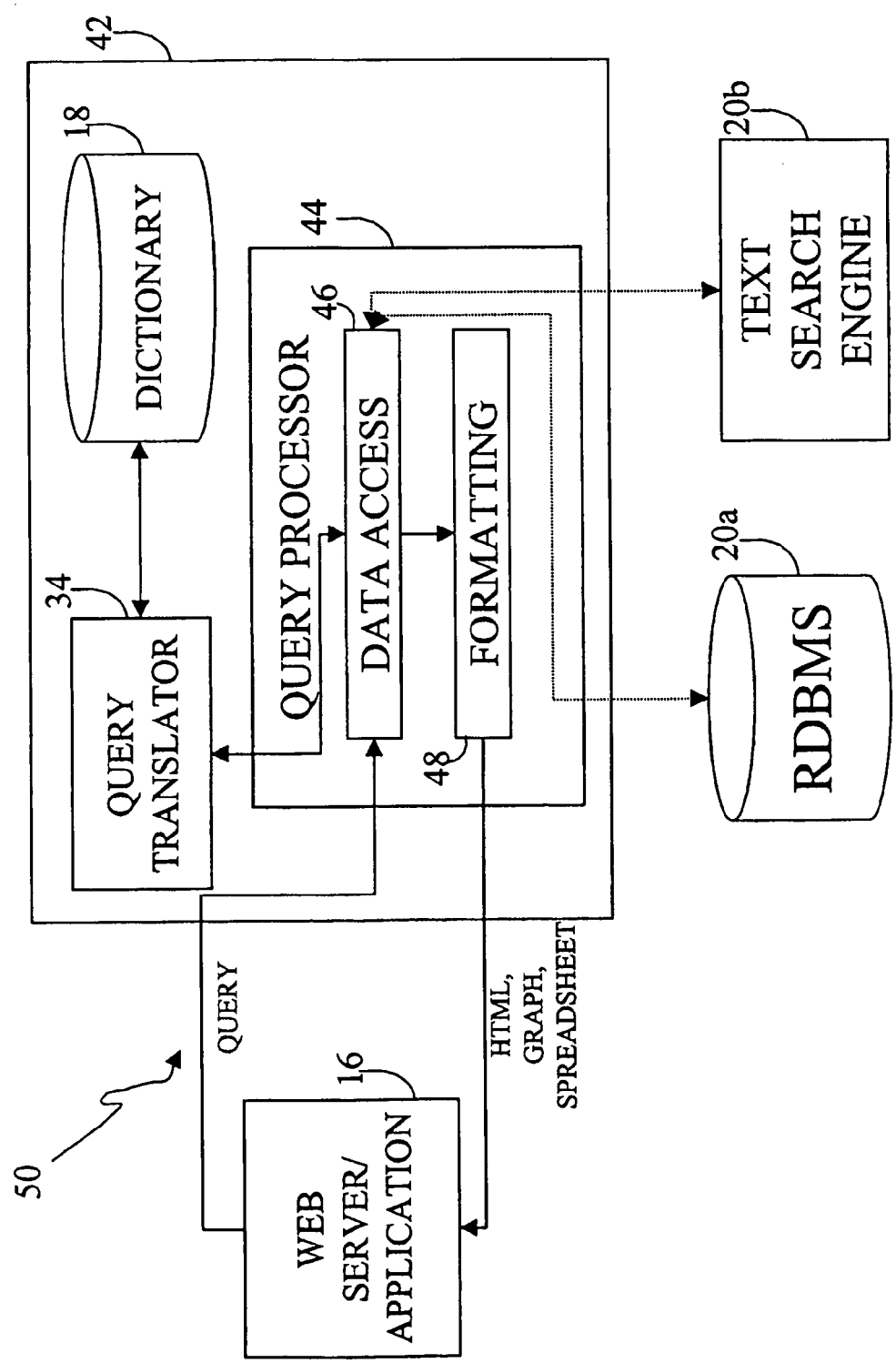
FIG. 5 displays systems and methods according to FIG. 1 for an exemplary query translation, retrieval, and presentation architecture; and, FIG. 6 is a diagram representing systems and methods in accordance with the principles of FIG. 1 that include a broker dictionary.

Referring to FIG. 5, there is a diagram for.an embodiment 50 where the search results can be presented to a server application in a ready-to-display format. As was shown in FIG. 4, in FIG. 5, a server 16 can provide query information, dictionary selection, and output format to the data access module 46 of the query processor 44. The data access module 46 can provide the query information and dictionary selection to the query translator module 34 that utilizes the specified dictionary 18 to generate a customized search or query. The customized search can be provided to the data access module 46 and executed against the appropriate data source 20. The results of the search can be returned to the formatting module 48 via the data access module 46, with the specified output format. The formatted search results can be provided to the server 16 for display. In the illustrated system of FIG. 4, the formatted results can be fully customizable HTML templates for output to the internet, and can include colors, headers, footers, and other customizable characteristics to match the web site. The HTML can additionally and optionally include graphs, pie charts, bar graphs, reports, and spreadsheets that can be displayed using, for example, ActiveX control or Java applet.

As indicated with reference to FIG. 4, the system and methods according to FIG. 5 can be practiced with multiple query translators 34 and/or dictionaries 18. Additionally, the data sources 20a, 20b can be multiple and can include other data sources than illustrated. In the embodiments herein, although identification can be provided with a query request, some embodiments may not utilize query information.

Figure 6:
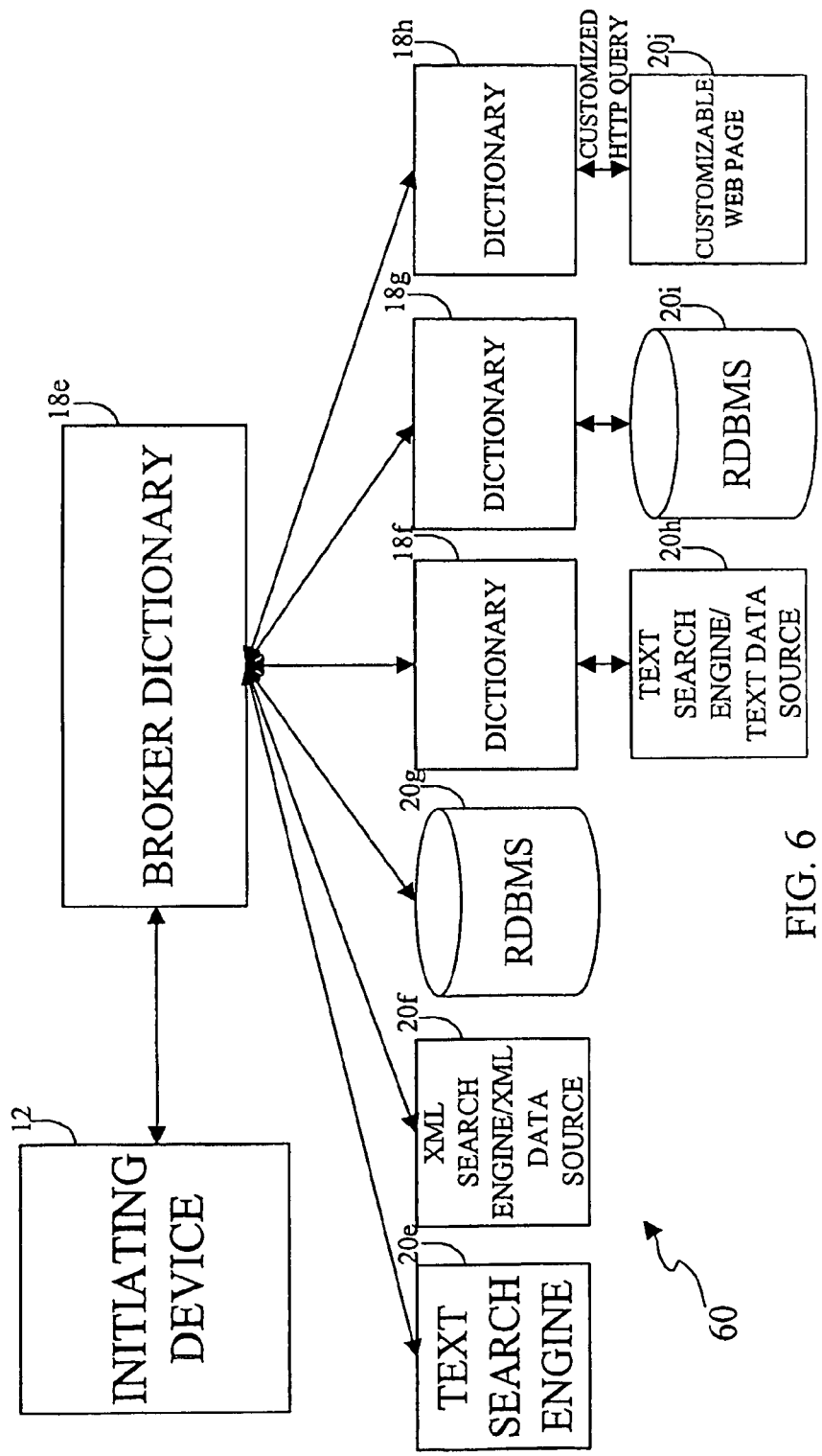

Referring now to FIG. 6, there is shown an embodiment 60 wherein a "broker dictionary" 18e can be utilized to interface to other dictionaries and data sources. One of ordinary skill in the art will recognize from the description of the methods and systems provided herein, that a server 16 that is not illustrated, can be associated with the broker dictionary 18e. The illustrated broker dictionary 18e can include, for example, URLs of other servers at different locations in a local or other network (e.g., internet, intranet, LAN, WAN, etc.) that have relevant data sources and/or dictionaries. Dictionaries to which the broker dictionary 18e can communicate can be referred to herein as broadcast dictionaries. In an embodiment, the broker dictionary 18e can provide an interface for a subscriber 16 with multiple servers. The multiple servers can maintain different customized dictionaries, or can share the broker dictionary 18e. In some embodiments, the broker dictionary 22 can interface to multiple subscribers 16 and/or data sources 20.

According to the FIG. 6 system, the broker dictionary 18e can receive query information from the initiating device 12 and the broker dictionary 18e can filter the search request to eliminate broadcast dictionaries and/or data sources 20 that do not include data relevant to the query information. The broker dictionary 18e can therefore include sophisticated and intelligent filters to eliminate unneeded broadcast search requests. Those with ordinary skill in the art will recognize that the broker dictionary 18e can include the attributes previously provided to dictionaries in general, including but not limited to language translation, synonym generation, natural language processing, business rules, etc.

The broker dictionary 18e can relay or broadcast query information, as processed by the broker dictionary 18e, unprocessed, or a combination thereof, to the selected broadcast dictionaries 18f, 18g, 18h and other data sources 20e, 20f, 20g. For example, in the illustrated system of FIG. 5, the broker dictionary 18e can process the query information to provide a customized query that can be provided to the non-broadcast dictionary data sources 20e, 20f, 20g. Similarly, the broadcast dictionaries 18f, 18g, 18h can receive either the customized query information or the original query information from the initiating device 12. In either case, the broadcast dictionaries 18f, 18g, 18h can process the received query information from the broker dictionary 18e, and distribute a customized query to one or more data sources 20h, 20i, 20j as provided previously herein. The customized query results from the different data sources 20e-20j can be transmitted or otherwise transferred to the broker dictionary 18e. The illustrated broker dictionary 18e can receive customized query search results and format the results to present a single result package to the initiating device 12 or other server 16 or application as provided herein. In some embodiments, the broker dictionary 18e can filter the search results before transferring or communicating the search results as provided herein.

Those with ordinary skill in the art will recognize that the systems and methods herein can include one or more databases that can be in communication with the servers 16 but are not otherwise illustrated in the representative figures. For example, a database can be utilized to maintain information based on user identity and privileges, broker dictionaries and associated broadcast dictionaries, rules for filtering query results, etc.

Accordingly, it can be understood that the methods and systems disclosed herein can be applied to a variety of queries. For example, the query information initially submitted can be a question, such as "How far is bank XXX from home?", such that data pertinent to the user (e.g., "home") and data related to a another sensor or entity (e.g., mapping program or distance calculator) can be integrated with the query information to provide an appropriate response. Questions can be presented in succession, and results from one question can be a basis as input to the dictionary for subsequent questions.

The techniques described herein are not limited to a particular hardware or software configuration, and may find applicability in many computing or processing environments. The techniques can be implemented in hardware or software, or a combination of hardware and software. The techniques can be implemented in one or more computer programs executing on one or more programmable computers that include a processor, a storage medium readable by the processor (including volatile and non-volatile memory and/or storage elements), one or more input devices, and one or more output devices.

The computer program(s) is preferably implemented in one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

One potential advantage of the methods and systems is that an internet user may obtain reliable, accurate, and efficiently organized information in response to a search or query request.

What has thus been described is a method and system for providing efficient searching of devices on communications networks, such as servers on the internet, using an application that can survey a subscriber's server that can include a catalog and database, and use the formatting information and data from the survey to create a dictionary customized to the subscriber's data sources. A user seeking information can initiate a search from an initiating device using keywords, natural language terms, connectors, expressions, etc., wherein such query information can be transmitted to various subscriber customized dictionaries. The customized dictionaries can customize the query based on respective subscriber databases and text documents, text search engines, etc., to produce an accurate search result. The search results can be filtered and integrated for presentation to the initiating device. Search results can be customized using user preference or profile information.

Although the methods and systems have been described relative to specific embodiments thereof, the methods and systems are not so limited. Obviously many modifications and variations may become apparent in light of the above teachings. For example, although the illustrated embodiment presented herein related to the internet, the methods and systems can be applied to searching other devices on other communications networks. Although HTML and XML languages were utilized to facilitate the searching, other languages may be utilized. The survey program can be run locally on a server, or remotely from another platform. Similarly, a dictionary can be accessed and/or managed locally or remotely using wired or wireless communications systems and methods. Results of customized queries can be aggregated at a server having multiple data sources, and thereafter transferred to the system server that can aggregate the results. In another embodiment, an application residing on the initiating device can receive and aggregate the results for presentation on the device. In an embodiment, search results can be displayed according to a user identification and/or information stored in a central database or local memory that includes user-specific preferences. The preferences can indicate suppliers, price, and other search-relevant criteria that can be submitted with the natural language search terms. In embodiments utilizing a user account for preferences, the respective subscriber dictionaries can integrate the user's preferences with the search terms to increase the probability of satisfying a search query for a user. In another embodiment, a user can be prompted for preference criteria, while in another embodiment, user identification data can be entered and submitted with the search criteria. Upon receiving the user identification data, a dictionary can cause a pre-stored user profile to be extracted and incorporated into the search.

In some embodiments, a user can be presented with search results and can select the desired results for purchase. Search results can be accompanied by a URL of the order processing system that can be used to order the product; and, when the user selects the item, the relevant product information can be submitted to the purchasing system to initiate the purchase process. In an embodiment, the user's selection of a product can provide a transition to an order basket or other ordering scheme that can be provided by the initiating website, the subscriber's website, or an alternate website. In these embodiments, the ordering scheme can interface to a browser or other interface at the initiating device.

Data sources and dictionaries do not have to reside on the same server, medium, etc. Additionally, methods of presenting a query and presenting query results can be integrated with instant messaging and/or email.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method for using a broker dictionary to generate a query specific to content and organization of a data source stored on a computer-readable medium, the method comprising:
   receiving query information in a natural language form for querying the data source;
   identifying, using the broker dictionary, a broadcast dictionary generated using the content and organization of the data source for transforming the received query information, wherein the broadcast dictionary is a dictionary that is adapted to communicate with the broker dictionary and the broker dictionary provides an interface for a subscriber to multiple servers having different customized broadcast dictionaries;
   transforming the received query information, wherein the transforming comprises generating one or more variations of a word included in the query information in a natural language form and determining one or more structured queries associated with the one or more variations of the word included in the query information in a natural language form; and
   responsive to transforming the received query information, generating at least one query customized to the content and organization of the data source.

2. The method of claim 1, wherein transforming the received query information in a natural language form further comprises:
   correcting spelling errors in the query information in a natural language form to generate a corrected natural language query; and
   determining an approximate structured query associated with the corrected natural language query.

3. The method of claim 2, wherein correcting spelling errors in the query information in a natural language form comprises:
   verifying a spelling of at least one word included in the query information; and
   generating a phonetic equivalent of at least one word in the query information.

4. The method of claim 1, wherein transforming the received query information further comprises:
   identifying a phrase included in the query information in a natural language form, the phrase comprising one or more words;
   associating a context with the identified phrase; and
   responsive to the associated context, determining a structured query associated with the identified phrase.

5. The method of claim 1, further comprising:
   identifying a logical operator included in the query information in a natural language form, the logical operator connecting a first word and a second word and specifying a relationship between the first word and the second word; and
   responsive to the relationship between the first word and the second word, determining a structured query associated with the first word and the second word.

6. The method of claim 1, wherein the at least one query customized to the content and organization of the data source results in a result set provided to the broadcast dictionary.

7. The method of claim 6, further comprising the broadcast dictionary organizing and formatting the result set for display.

8. A computer-readable storage medium storing a computer program executable by a processor of a computer for causing a broker dictionary to generate a query specific to content and organization of a data source stored on a computer-readable medium, the computer program comprising instructions for:
   receiving query information in a natural language form for querying the data source;
   identifying, using the broker dictionary, a broadcast dictionary generated using the content and organization of the data source for transforming the received query information, wherein the broadcast dictionary is a dictionary that is adapted to communicate with the broker dictionary and the broker dictionary provides an interface for a subscriber to multiple servers having different customized broadcast dictionaries;
   transforming the received query information, wherein the transforming comprises generating one or more variations of a word included in the query information in a natural language form and determining one or more structured queries associated with the one or more variations of the word included in the query information in a natural language form; and
   responsive to transforming the received query information, generating at least one query customized to the content and organization of the data source.

9. The computer-readable storage medium of claim 8, wherein transforming the query information in a natural language form further comprises:
   correcting spelling errors in the query information in a natural language form to generate a corrected natural language query; and
   determining an approximate structured query associated with the corrected natural language query.

10. The computer-readable storage medium of claim 9, wherein correcting spelling errors in the query information in a natural language form comprises:
    verifying a spelling of at least one word included in the query information in a natural language form; and
    generating a phonetic equivalent of at least one word in the query information in a natural language form.

11. The computer-readable storage medium of claim 8, wherein transforming the query information in a natural language form further comprises:
    identifying a phrase included in the query information in a natural language form, the phrase comprising one or more words;
    associating a context with the identified phrase; and
    responsive to the associated context, determining a structured query associated with the identified phrase.

12. The computer-readable storage medium of claim 8, further comprising:
    identifying a logical operator included in the query information in a natural language form, the logical operator connecting a first word and a second word and specifying a relationship between the first word and the second word; and
    responsive to the relationship between the first word and the second word, determining the structured query associated with the first word and the second word.

13. A method for generating queries specific to content of a multiple data sources stored on one or more computer-readable storage media, the method comprising:
    receiving query information in a natural language form for querying the multiple data sources;
    identifying a broker dictionary that acts as an intelligent filtering mechanism for multiple custom broadcast dictionaries, each custom broadcast dictionary associated with one of the multiple data sources and each generated using the content of the one of the multiple data sources;

broadcasting from the broker dictionary the received natural language query to the multiple custom broadcast dictionaries; and the multiple custom broadcast dictionaries each transforming the received query information, wherein the transforming comprises:

generating one or more variations of a word included in the query information in a natural language form, determining one or more structured queries associated with the one or more variations of the word included in the query information in a natural language form and generating at least one query customized to the content of the each associated data source.

14. The method of claim 13, wherein the queries customized to the content and organization of the each associated data source result in multiple result sets provided to the broker dictionary.

15. The method of claim 14, further comprising the broker dictionary aggregating the result sets for display.

* * * * *